(12) United States Patent
Karr et al.

(10) Patent No.: US 8,255,661 B2
(45) Date of Patent: Aug. 28, 2012

(54) DATA STORAGE SYSTEM COMPRISING A MAPPING BRIDGE FOR ALIGNING HOST BLOCK SIZE WITH PHYSICAL BLOCK SIZE OF A DATA STORAGE DEVICE

(75) Inventors: Christopher P. Karr, Lake Forest, CA (US); Richard J. Procyk, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 468 days.

(21) Appl. No.: 12/618,667

(22) Filed: Nov. 13, 2009

(65) Prior Publication Data

US 2011/0119464 A1 May 19, 2011

(51) Int. Cl.
*G06F 12/00* (2006.01)

(52) U.S. Cl. ............ 711/171; 711/4; 711/103; 711/111; 711/154; 711/165; 711/202; 711/218

(58) Field of Classification Search ............. 711/171, 711/4, 103, 111, 154, 165, 202, 218
See application file for complete search history.

(56) References Cited

U.S. PATENT DOCUMENTS

| | | | |
|---|---|---|---|
| 5,822,142 A | 10/1998 | Hicken | |
| 6,035,351 A | 3/2000 | Billings et al. | |
| 6,191,712 B1 | 2/2001 | Still | |
| 6,226,727 B1 * | 5/2001 | Ito | 711/170 |
| 6,385,711 B1 | 5/2002 | Colligan | |
| 6,523,085 B1 | 2/2003 | Hodges et al. | |
| 6,751,686 B2 | 6/2004 | Takasugi et al. | |
| 6,925,526 B2 | 8/2005 | Hall | |
| 7,080,200 B2 | 7/2006 | Hassner et al. | |
| 7,174,440 B2 | 2/2007 | Chang et al. | |
| 7,240,180 B2 | 7/2007 | Forrer, Jr. et al. | |
| 7,330,417 B2 | 2/2008 | Billau et al. | |
| 7,433,990 B2 | 10/2008 | Wurzburg et al. | |
| 7,603,530 B1 * | 10/2009 | Liikanen et al. | 711/162 |
| 8,019,925 B1 * | 9/2011 | Vogan et al. | 711/4 |
| 8,019,959 B2 * | 9/2011 | Wu et al. | 711/171 |
| 8,027,194 B2 * | 9/2011 | Lee et al. | 365/185.03 |
| 2006/0174049 A1 | 8/2006 | Lin et al. | |
| 2007/0050593 A1 | 3/2007 | Chen et al. | |
| 2008/0028162 A1 | 1/2008 | Thompson | |
| 2008/0162811 A1 | 7/2008 | Steinmetz et al. | |
| 2008/0307192 A1 | 12/2008 | Sinclair et al. | |
| 2009/0150614 A1 | 6/2009 | Auerbach et al. | |
| 2009/0168230 A1 | 7/2009 | Hwang et al. | |

* cited by examiner

*Primary Examiner* — Stephen Elmore

(57) ABSTRACT

A data storage system is disclosed comprising a non-volatile memory and a first interface operable to receive a write command from a host, the write command comprising a host write data block having a host logical block size. A block mapping bridge divides the host write data block into a plurality of transfer data blocks, wherein each transfer data block having a device logical block size smaller than the host logical block size. The transfer data blocks are transmitted through a second interface to control circuitry that accumulates the transfer data blocks into a physical data block having a device physical block size equal to a first integer multiple of the device logical block size, wherein the host logical block size is a second integer multiple of the device physical block size. The physical data block is then written to the non-volatile memory.

18 Claims, 5 Drawing Sheets

DATA STORAGE SYSTEM COMPRISING A MAPPING BRIDGE FOR ALIGNING HOST BLOCK SIZE WITH PHYSICAL BLOCK SIZE OF A DATA STORAGE DEVICE

BACKGROUND

Description of the Related Art

Computer systems (e.g., desktops, laptops, portables, etc) as well as consumer devices (e.g., cell phones, cameras, television set top boxes, etc.) typically employ some form of a non-volatile data storage device such as a disk drive, or a solid state drive comprising a non-volatile semiconductor memory such as flash memory. A solid state drive typically emulates a disk drive so that the same communication protocol may be employed, such as the Advanced Technology Attachment (ATA) protocol.

A host typically communicates with the data storage device in data blocks referred to as data sectors. Each data sector is typically assigned a physical block address (PBA) which is accessed indirectly through a logical block address (LBA) to facilitate mapping out defective data sectors. The size of a data sector recorded on the data storage device (physical block size) may be different from the block size employed in the interface (logical block size). For example, the ATA protocol specifies a logical block size of 512 bytes whereas the physical block size of each data sector stored on the data storage device may be 4096 bytes. If the data storage device receives a write command to write a 512 byte inner block of a 4096 byte data sector, the data sector must first be read, modified with the new 512 data block, and then rewritten. This "read-modify-write" process can significantly degrade the performance of the data storage device.

DETAILED DESCRIPTION OF EMBODIMENTS OF THE INVENTION

Figure 1:
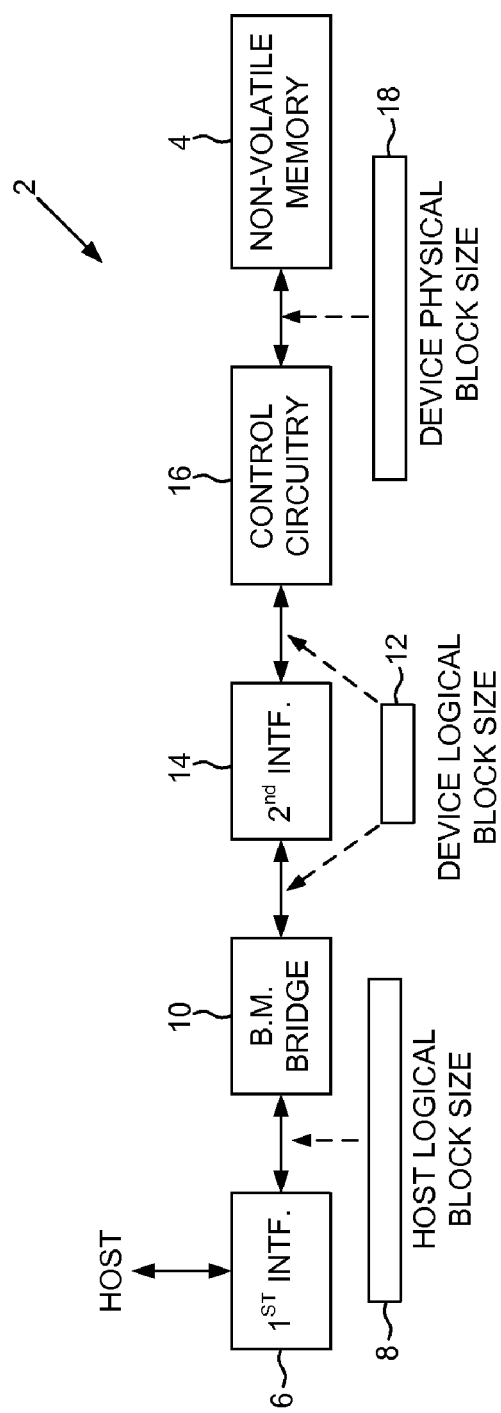
FIG. 1 illustrates a data storage system according to an embodiment of the present invention comprising a non-volatile memory and a block mapping bridge for aligning a host block size with a physical block size of the non-volatile memory.

FIG. 1 shows an exemplary data storage system 2 comprising a non-volatile memory 4, and a first interface 6 operable to receive a write command from a host. The write command comprises a host write data block having a host logical block size 8. A block mapping bridge 10 divides the host write data block into a plurality of transfer data blocks, wherein each transfer data block having a device logical block size 12 smaller than the host logical block size 8. The transfer data blocks are transmitted through a second interface 14 to control circuitry 16, wherein the control circuitry 16 accumulates the transfer data blocks into a physical data block having a device physical block size 18 equal to a first integer multiple of the device logical block size 12. The host logical block size 8 is a second integer multiple of the device physical block size 18. The first integer is greater than one, and the second integer is at least one. The physical data block is written to the non-volatile memory 4.

The data storage system 2 of FIG. 1 may comprise any suitable device, such as a disk drive or a solid state drive, and the host may be implemented within a separate housing or within the same housing as the data storage system 2. For example, the host may be implemented as a personal computer (desktop or laptop) and the data storage system 2 as an internal or external disk drive or solid state drive connected wired or wirelessly to the host. In addition, as described in greater detail below, the first interface 6 may comprise a software component (e.g., a device driver of a host operating system) and in other embodiments the first interface 6 may comprise a transport protocol over a wired or wireless connection (e.g., SCSI, USB, etc.).

In the embodiments of the present invention, the non-volatile memory 4 employs a device physical block size 18 that is a multiple of the device logical block size 12 employed in the second interface 14. For example, in one embodiment the second interface 14 implements a conventional disk drive protocol (e.g., the ATA protocol) having an established device logical block size (e.g., 512 bytes), whereas the non-volatile memory 4 (e.g., disk or solid state memory) may implement a larger device physical block size (e.g., 4096 bytes). To avoid the performance degradation of a "read-modify-write," the block mapping bridge 10 returns a host logical block size 8 equal to an integer multiple of the device physical block size 18 (e.g., if the integer is one, the host logical block size 8 returned equals the device physical block size 18). This forces the host to transmit access commands (write or read) in block sizes equal to an integer multiple (rather than a fraction) of the device physical block size 18, thereby avoiding the need for a "read-modify-write" operation.

Figure 2:
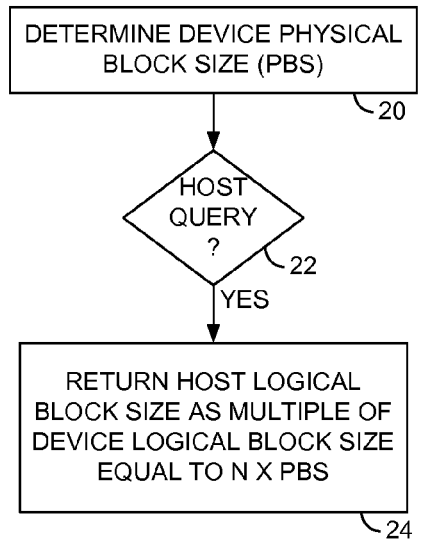
FIG. 2 is a flow diagram according to an embodiment of the present invention wherein the block mapping bridge returns a host logical block size in response to a host query equal to a multiple of the device's logical block size and also equals a multiple of the devices physical block size.

FIG. 2 is a flow diagram according to an embodiment of the present invention wherein the block mapping bridge determines the device physical block size of the non-volatile memory (step 20). When the block mapping bridge receives a host query (step 22), the block mapping bridge returns a host logical block size of the data storage system equal to an integer multiple of the device logical block size which is an integer multiple of the device physical block size (step 24). For example, if the device physical block size is 4096 bytes, and the device logical block size is 512 bytes, the block mapping bridge may return 4096 bytes (or a multiple thereof) as the host logical block size. Any suitable technique may be employed for the host to query the data storage system for its host logical block size. For example, the host may issue a SCSI Read Capacity Command or a Mode Sense Command for mode page 03h. When the block mapping bridge receives either of these requests, it returns the desired host logical block size as a multiple of the device physical block size (rather than return the device logical block size as in the prior art).

Figure 3:
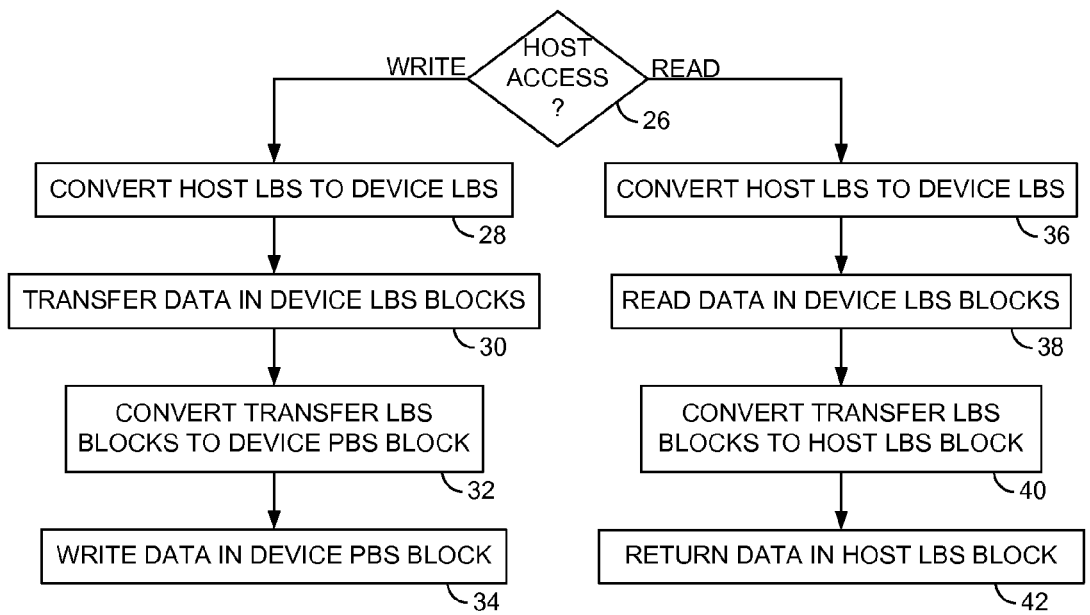
FIG. 3 is flow diagram according to an embodiment of the present invention for performing a write operation and a read operation by transferring data blocks having a device logical block size.

FIG. 3 is a flow diagram for performing write and read operations according to an embodiment of the present invention. If a write command is received from the host over the first interface (step 26), the block mapping bridge converts the host logical block size for the write command into the device logical block size (step 28). The block mapping bridge then transmits the write data for the write command over the second interface in multiple transfer data blocks having the device logical block size (step 30). The control circuitry accumulates the transfer data blocks into a physical data block having the device physical block size (step 32), and then writes the physical data block to the non-volatile memory without performing a "read-modify-write" operation (step 34).

Figure 4A:
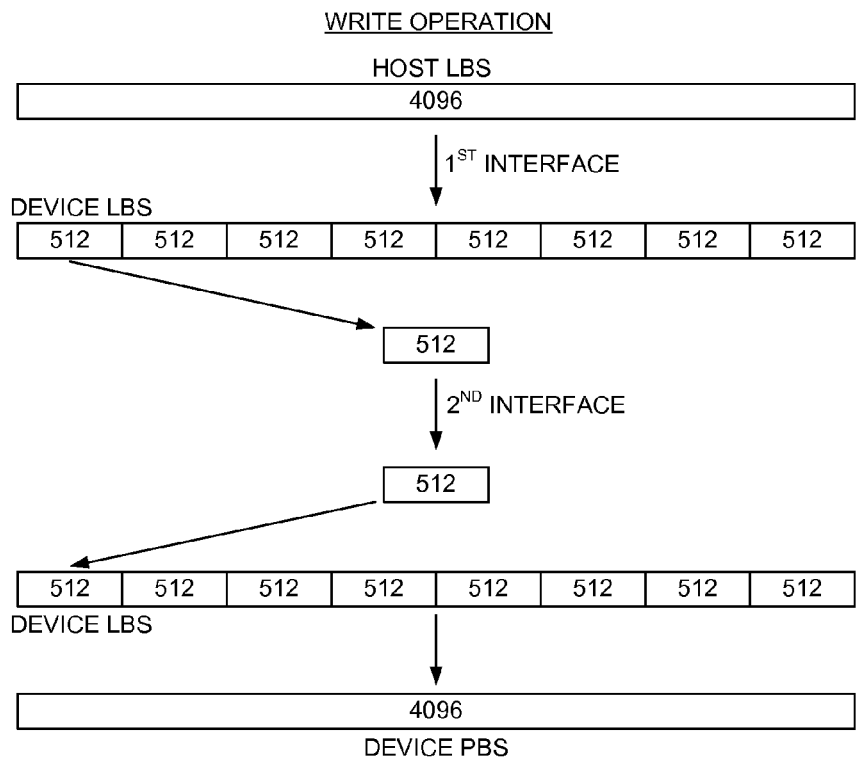
FIG. 4A illustrates a write operation according to an embodiment of the present invention.

In an example write operation shown in FIG. 4A, the host logical block size is 4096 bytes and the device logical block size is 512 bytes. The block mapping bridge receives a host write data block (4096 bytes) over the first interface and divides the host write data block into a plurality of transfer data blocks having a device logical block size of 512 bytes. The block mapping bridge then transmits each transfer data block (512 bytes) over the second interface. On the other side of the second interface, the control circuitry accumulates the transfer data blocks into at least one physical data block having the device physical block size of 4096 bytes. The control circuitry then writes the physical data block (4096 bytes) to the non-volatile memory without performing a "read-modify-write" operation.

In the embodiment of FIG. 4A, the host logical block size equals the device physical block size (4096 bytes). In another embodiment, the host logical block size may equal multiple physical block sizes (e.g., 2×4096=8192 bytes). In this embodiment, for each host write data block the control circuitry would accumulate a first set of transfer data blocks into a first physical data block written to the non-volatile memory, and then accumulate a second set of transfer data blocks into a second physical data block written to the non-volatile memory.

In one embodiment, the block mapping bridge implements a suitable conversion algorithm for converting logical block addresses received in host write commands into corresponding logical block addresses for the control circuitry. In the example of FIG. 4A, the control circuitry may map eight device logical data blocks (512 bytes each) into a physical data block (4096 bytes). That is, in the embodiment of FIG. 4A the number of device logical blocks equals eight times the number of device physical blocks and eight times the number of host logical blocks. In one embodiment, the host write command comprises a starting host logical block address and a number of host logical data blocks to write. The block mapping bridge multiplies by eight to convert the starting host logical block address into a starting device logical block address, and multiplies by eight to convert the number of host logical data blocks into the number of device logical data blocks to transmit over the second interface. After transmitting the device logical data blocks over the second interface, the control circuitry performs a similar conversion to convert the device logical block address into a device physical block address for writing the physical data blocks to the non-volatile memory.

Referring again to the flow diagram of FIG. 3, if a read command is received from the host over the first interface (step 26), the block mapping bridge converts the host logical block size for the read command into the device logical block size (step 36). The block mapping bridge may also convert a starting host logical block address into a starting device logical block address. The block mapping bridge then transmits read commands to the control circuitry over the second interface, wherein each read command requests a transfer data block having the device logical block size (step 38). The block mapping bridge accumulates the transfer data blocks into a host read data block having the host logical block size (step 40) and then transmits the host read data block to the host (step 42).

Figure 4B:
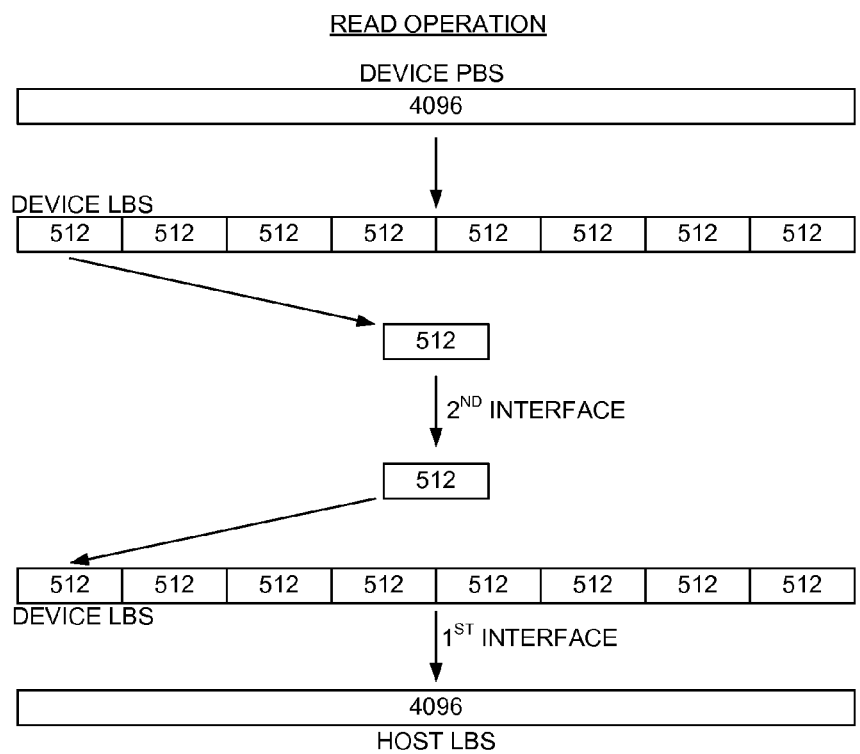
FIG. 4B illustrates a read operation according to an embodiment of the present invention.

In an example read operation shown in FIG. 4B, the host logical block size is 4096 bytes and the device logical block size is 512 bytes. The block mapping bridge receives a read command from the host to read at least one host read data block (4096 bytes) over the first interface. The block mapping bridge divides the host read request into a plurality of transfer read requests having a device logical block size of 512 bytes, and then receives each transfer data block (512 bytes) over the second interface. The block mapping bridge accumulates the transfer data blocks into at least one host read data block having the host logical block size of 4096 bytes. The block mapping bridge then transmits the host read data block to the host over the first interface.

In one embodiment, the block mapping bridge implements a suitable conversion algorithm for converting logical block addresses received in host read commands into corresponding logical block addresses for the control circuitry similar to the conversion described above for host write commands.

Figure 5A:
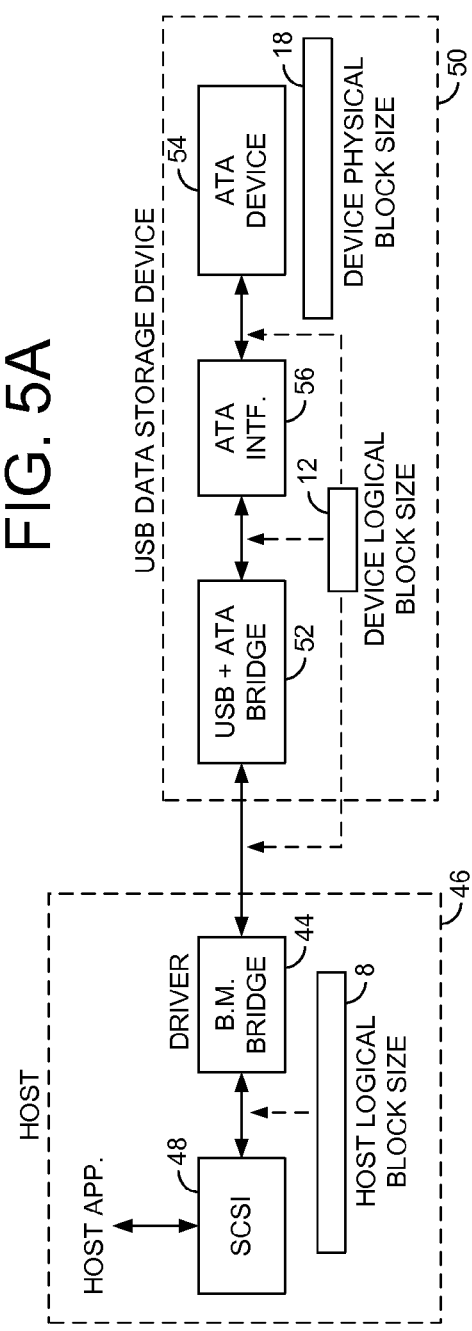
FIG. 5A illustrates an embodiment of the present invention wherein the block mapping bridge is implemented as a device driver of a host operating system.

The block mapping bridge 10 shown in FIG. 1 may be implemented in any suitable manner within any suitable device. In an example embodiment shown in FIG. 5A the block mapping bridge 44 comprises a device driver implemented as part of the operating system of a host 46. The first interface comprises a SCSI interface 48 for providing an interface to the host applications. The block mapping bridge 44 communicates with a suitable storage device, such as a Universal Serial Bus (USB) storage device 50 in the embodiment of FIG. 5A. The USB storage device 50 comprises the second interface including a USB plus ATA bridge 52 for interfacing with the block mapping bridge 44 on the host side. The USB plus ATA bridge 52 interfaces with an ATA device 54 (e.g., an ATA disk drive or solid state drive) through an ATA interface 56. The first interface may also implement any suitable protocol instead of SCSI, such as ATA version 8 or higher, and the second interface may implement any suitable protocol other than FIG. 5A's exemplary USB, such as FireWire or Fiber Channel. In general, any suitable protocol that may implement different logical and physical block sizes can be employed in embodiments of the present invention.

Figure 5B:
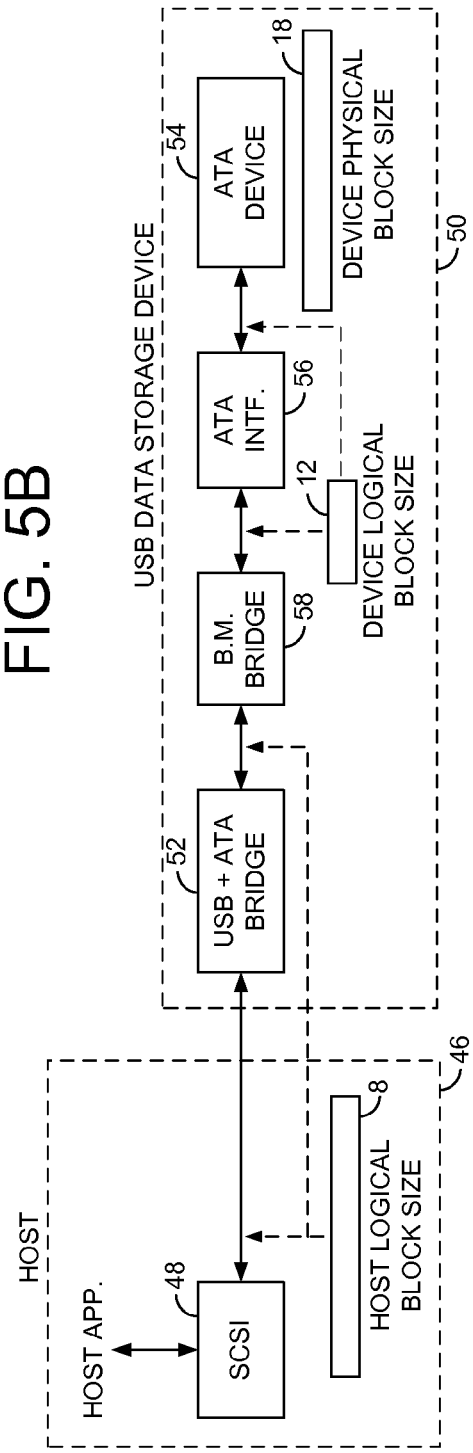
FIG. 5B illustrates an embodiment of the present invention wherein the block mapping bridge is implemented within a USB data storage device.

FIG. 5B shows an alternative embodiment of the present invention wherein the block mapping bridge 58 may be implemented within the USB data storage device 50 between the USB plus ATA bridge 52 and the ATA interface 56. In this embodiment, the first interface comprises the SCSI interface 48 and the USB plus ATA bridge 52, the second interface comprises the ATA interface 56, and the block mapping bridge 58 is implemented as firmware integrated with the second interface.

Other configurations of bridging interfaces and storage devices may be employed in embodiments of the present invention. For example, in one embodiment the host may comprise a host bus adapter for bridging a host bus (e.g., a PCI host bus) to a suitable storage device (e.g., an ATA device). In this embodiment, the block mapping bridge 10 of FIG. 1 may be implemented as a driver for bridging the first interface comprising a suitable protocol (e.g., SCSI) to the second interface comprising the host bus adapter.

Figure 6:
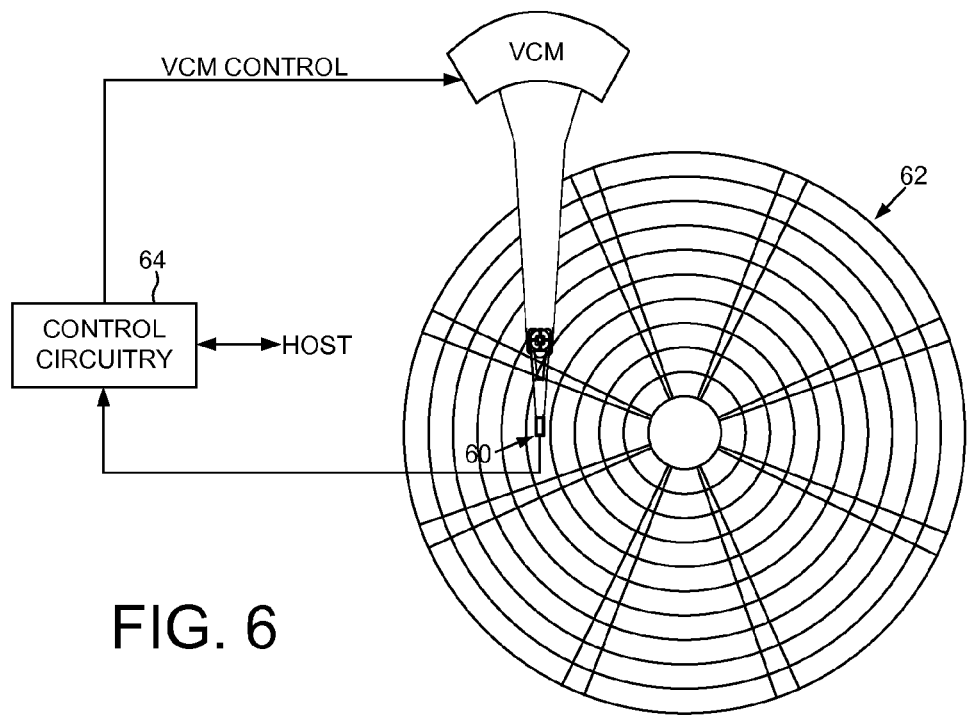
FIG. 6 illustrates an embodiment of the present invention wherein the data storage system comprises a disk drive.
Figure 7:
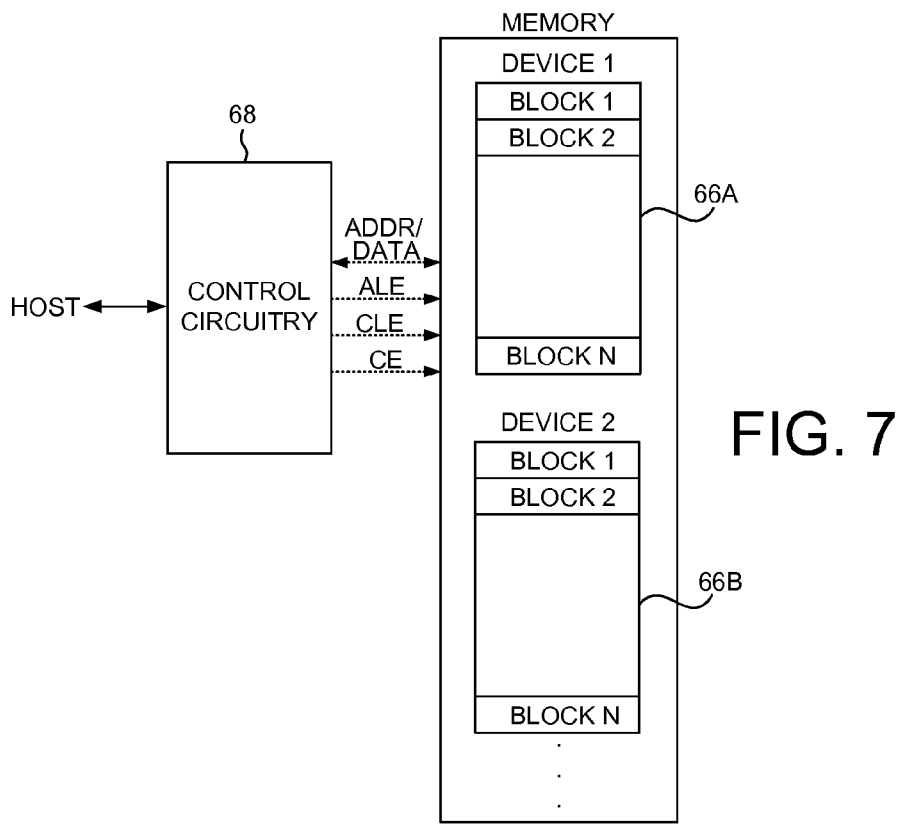
FIG. 7 illustrates an embodiment of the present invention wherein the data storage system comprises a solid state drive.

The embodiments of the present invention may be employed in any suitable data storage system. FIG. 6 shows a data storage system comprising a disk drive including a head 60 actuated over a disk 62 and control circuitry 64 for executing at least part of the flow diagrams described herein. FIG. 7 shows a solid state drive comprising a plurality of non-volatile semiconductor memories 66A, 66B, etc., such as flash memories, and control circuitry 68 for executing at least part of the flow diagrams described herein. A hybrid data storage system may also be employed comprising components of a disk drive shown in FIG. 6 combined with the non-volatile semiconductor memories shown in FIG. 7.

Although the foregoing has been described in terms of certain embodiments, other embodiments will be apparent to those of ordinary skill in the art from the disclosure herein. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

What is claimed is:

1. A data storage system comprising:
    a non-volatile memory;
    a first interface operable to receive a write command from a host, the write command comprising a host write data block having a host logical block size; and
    a block mapping bridge operable to:
        divide the host write data block into a plurality of transfer data blocks, wherein each transfer data block having a device logical block size smaller than the host logical block size;
        transmit the transfer data blocks through a second interface to control circuitry, wherein the control circuitry operable to:
            accumulate the transfer data blocks into a physical data block having a device physical block size equal to a first integer multiple of the device logical block size, wherein:
                the host logical block size is a second integer multiple of the device physical block size;
                the first integer is greater than one; and
                the second integer is at least one; and
            write the physical data block to the non-volatile memory.

2. The data storage system as recited in claim 1, wherein the second integer equals one such that the host logical block size equals the device physical block size.

3. The data storage system as recited in claim 1, wherein the block mapping bridge is further operable to:
    receive a format query from the host requesting a block size of the data storage system; and
    return the second integer multiple of the device physical block size in response to the format query.

4. The data storage system as recited in claim 1, wherein:
    the first interface is further operable to receive a read command from the host; and
    the block mapping bridge is further operable to:
        read the plurality of transfer data blocks from the non-volatile memory through the second interface and accumulate the transfer data blocks into a host read data block having the host logical block size; and
        transfer the host read data block to the host.

5. The data storage system as recited in claim 1, wherein the second interface comprises an Advanced Technology Attachment (ATA).

6. The data storage system as recited in claim 5, wherein the first interface comprises a Small Computer System Interface (SCSI).

7. The data storage system as recited in claim 1, wherein the block mapping bridge comprises a device driver executed by a host operating system.

8. The data storage system as recited in claim 1, wherein the block mapping bridge comprises firmware integrated with the second interface.

9. The data storage system as recited in claim 1, wherein the non-volatile memory comprises a disk.

10. The data storage system as recited in claim 1, wherein the non-volatile memory comprises a semiconductor memory.

11. A method of operating a data storage system comprising a non-volatile memory, the method comprising:
    receiving a write command through a first interface from a host, the write command comprising a host write data block having a host logical block size;
    dividing the host write data block into a plurality of transfer data blocks, wherein each transfer data block having a device logical block size smaller than the host logical block size;
    transmitting the transfer data blocks through a second interface;
    accumulating the transfer data blocks into a physical data block having a device physical block size equal to a first integer multiple of the device logical block size, wherein:
        the host logical block size is a second integer multiple of the device physical block size;
        the first integer is greater than one; and
        the second integer is at least one; and
    writing the physical data block to the non-volatile memory.

12. The method as recited in claim 11, wherein the second integer equals one such that the host logical block size equals the device physical block size.

13. The method as recited in claim 11, further comprising:
    receiving a format query from the host requesting a block size of the data storage system; and
    returning the second integer multiple of the device physical block size in response to the format query.

14. The method as recited in claim 11, further comprising:
    receiving a read command from the host;
    reading the plurality of transfer data blocks from the non-volatile memory through the second interface and accumulate the transfer data blocks into a host read data block having the host logical block size; and
    transferring the host read data block to the host.

15. The method as recited in claim 11, wherein the second interface comprises an Advanced Technology Attachment (ATA).

16. The method as recited in claim 15, wherein the first interface comprises a Small Computer System Interface (SCSI).

17. The method as recited in claim 11, wherein the non-volatile memory comprises a disk.

18. The method as recited in claim 11, wherein the non-volatile memory comprises a semiconductor memory.

* * * * *